(12) United States Patent
Yamanaka

(10) Patent No.: US 8,139,756 B2
(45) Date of Patent: Mar. 20, 2012

(54) METHOD, APPARATUS, AND COMPUTER PRODUCT FOR COMPUTING SKILL VALUE

(75) Inventor: Hideki Yamanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1173 days.

(21) Appl. No.: 11/508,453

(22) Filed: Aug. 23, 2006

(65) Prior Publication Data

US 2007/0206770 A1 Sep. 6, 2007

(30) Foreign Application Priority Data

Mar. 3, 2006 (JP) ................................ 2006-058527

(51) Int. Cl.
*H04M 5/00* (2006.01)

(52) U.S. Cl. ......... 379/265.12; 379/265.06; 379/265.07; 379/265.11; 379/265.03; 379/265.14; 379/266.01; 379/266.02; 379/266.06; 379/266.07; 379/266.09

(58) Field of Classification Search ............. 379/265.01, 379/265.11; 705/8, 11
See application file for complete search history.

(56) References Cited

U.S. PATENT DOCUMENTS

| | | | | |
|---|---|---|---|---|
| 5,241,621 | A * | 8/1993 | Smart | 706/46 |
| 6,442,547 | B1 * | 8/2002 | Bowman-Amuah | 379/221.14 |
| 6,648,760 | B1 * | 11/2003 | Nicastro | 463/23 |
| 6,700,971 | B1 * | 3/2004 | Cohen et al. | 379/265.06 |
| 7,200,219 | B1 * | 4/2007 | Edwards et al. | 379/265.01 |
| 7,386,467 | B2 * | 6/2008 | Eitel et al. | 705/11 |
| 2002/0137015 | A1 * | 9/2002 | Guinta et al. | 434/323 |
| 2003/0002653 | A1 * | 1/2003 | Uckun | 379/266.06 |
| 2003/0046142 | A1 * | 3/2003 | Eitel et al. | 705/11 |
| 2003/0187723 | A1 * | 10/2003 | Hadden et al. | 705/11 |
| 2003/0229529 | A1 * | 12/2003 | Mui et al. | 705/8 |
| 2006/0026179 | A1 * | 2/2006 | Brown et al. | 707/100 |
| 2007/0019801 | A1 * | 1/2007 | Brenneman et al. | 379/265.11 |
| 2007/0025528 | A1 * | 2/2007 | Knott et al. | 379/32.01 |
| 2007/0041551 | A1 * | 2/2007 | Whitecotten et al. | 379/212.01 |
| 2007/0206768 | A1 * | 9/2007 | Bourne et al. | 379/265.01 |
| 2008/0208644 | A1 * | 8/2008 | Gray et al. | 705/7 |

FOREIGN PATENT DOCUMENTS

| | | |
|---|---|---|
| JP | 8-321885 | 12/1996 |
| JP | 10-224478 | 8/1998 |
| JP | 2000-092213 | 3/2000 |
| JP | 2000-285085 | 10/2000 |
| JP | 2001-195497 | 7/2001 |
| JP | 2001-237971 | 8/2001 |
| JP | 2002-007646 | 1/2002 |
| JP | 2002-007678 | 1/2002 |
| JP | 2002-056134 | 2/2002 |

(Continued)

OTHER PUBLICATIONS

Japanese Office Action, English-language Translation, mailed Mar. 1, 2011 for corresponding Japanese Application No. 2006-058527, 9 pages.

*Primary Examiner* — Joseph J Nguyen

(74) *Attorney, Agent, or Firm* — Fujitsu Patent Center

(57) ABSTRACT

A skill-value computing apparatus classifies inquiries into groups of easy and difficult inquiries, and computes a total skill value of an agent by taking into account the difficulty level of each inquiry.

16 Claims, 16 Drawing Sheets

FOREIGN PATENT DOCUMENTS

| | | |
|---|---|---|
| JP | 2002-109402 | 4/2002 |
| JP | 2002-216001 | 8/2002 |
| JP | 2002-237894 | 8/2002 |
| JP | 2002-297846 | 10/2002 |
| JP | 2002-366711 | 12/2002 |
| JP | 2004-503877 | 2/2004 |
| JP | 2004-157579 | 6/2004 |
| JP | 2004-535090 | 11/2004 |
| JP | 2004-355613 | 12/2004 |
| JP | 2005-018587 | 1/2005 |
| JP | 2005-258551 | 9/2005 |
| WO | WO-01/97083 | 12/2001 |
| WO | WO-02/071226 | 9/2002 |

* cited by examiner

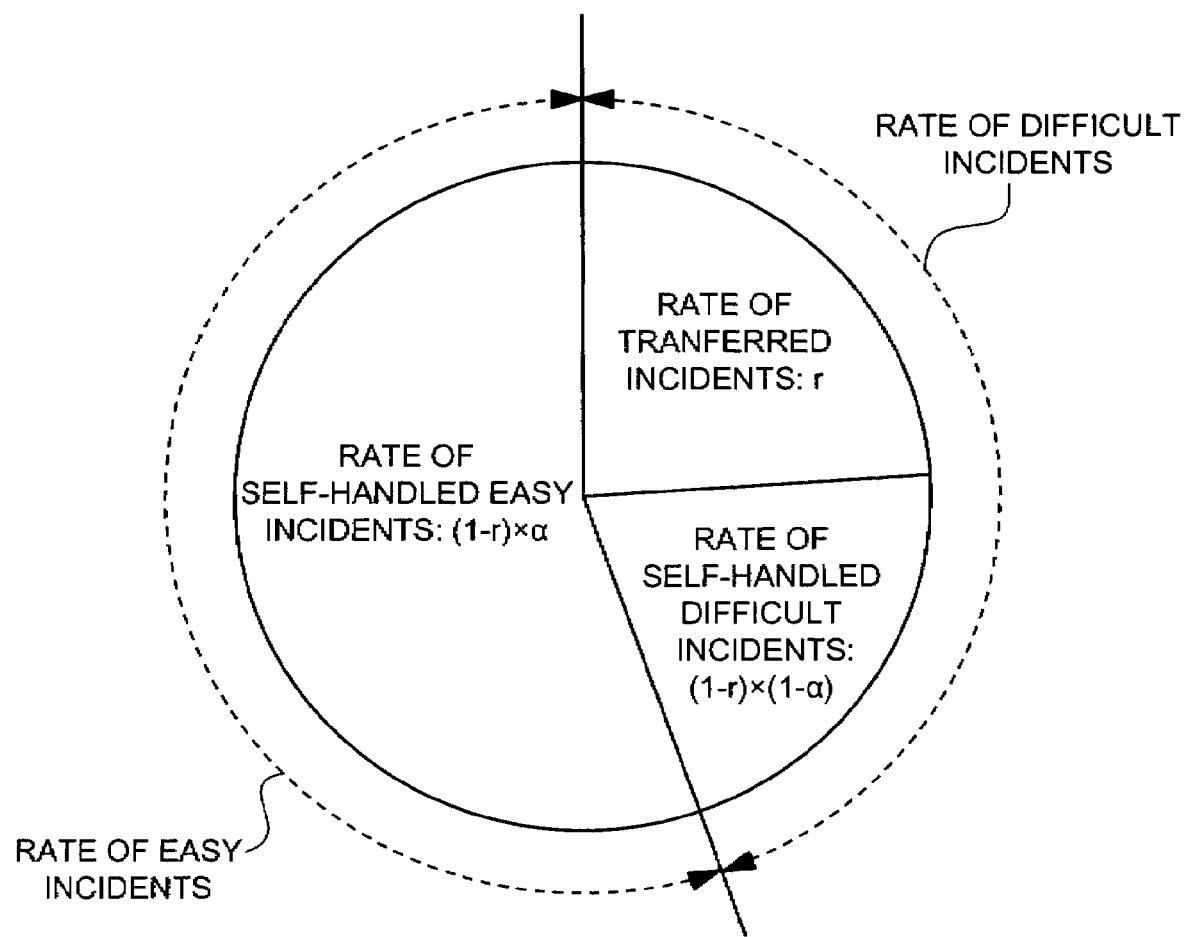

| SERVICE CATEGORY | CLASSIFICATION RULE |
|---|---|
| INTERNET CONNECTION | INTERNET & CONNECTION |
| MEMBERSHIP MANAGEMENT | SIGN-UP & OFFER, CANCELLATION |
| ... | ... |

FIG.7

| INCIDENT ID | AGENT ID | TRANSFERRED INCIDENT ID | RESPONSE START TIME | RESPONSE FINISHED TIME | CONTENTS OF INQUIRY | CONTENTS OF ANSWER |
|---|---|---|---|---|---|---|
| 5230001 | OP002 | - | 2006/1/24 9:23:34 | 2006/1/25 9:31:21 | CANNOT CONNECT TO INTERNET ... | CHECK CONNECTION OF LAN CABLE ... |
| 5230002 | OP001 | 5230003 | 2006/1/24 9:24:11 | 2006/1/25 9:24:53 | OFFER OF SIGN-UP ... | SERVICE WILL BE AVAILABLE FROM TOMORROW ... |
| 5230003 | OP003 | - | 2006/1/25 9:24:53 | 2006/1/25 9:35:54 | OFFER OF SIGN-UP ... | SERVICE WILL BE AVAILABLE FROM TOMORROW ... |
| ... | ... | ... | ... | ... | ... | ... |

FIG.8

| INCIDENT ID | AGENT ID | TRANS-FERRED INCIDENT ID | RESPONSE START TIME | RESPONSE FINISHED TIME | LIST OF INQUIRED WORDS | LIST OF ANSWERED WORDS | SERVICE CATEGORY | CLUSTER ID |
|---|---|---|---|---|---|---|---|---|
| 5230001 | OP002 | - | 2006/1/24 9:23:34 | 2006/1/25 9:31:21 | ((INTERNET, 1) (CONNECTION, 1)) | ((LAN CABLE, 2) (CONNECTION, 3)) | INTERNET CONNECTION | 30486 |
| 5230002 | OP001 | 5230003 | 2006/1/24 9:24:11 | 2006/1/25 9:24:53 | ((SIGN-UP, 1) (OFFER, 1)) | ((SERVICE, 1) (AVAILABLE, 2)) | MEMBERSHIP MANAGEMENT | 30718 |
| 5230003 | OP003 | - | 2006/1/25 9:24:53 | 2006/1/25 9:35:54 | ((SIGN-UP, 1) (OFFER, 1)) | ((SERVICE, 1) (AVAILABLE, 2)) | MEMBERSHIP MANAGEMENT | 30875 |
| ... | ... | ... | ... | ... | ... | ... | ... | ... |

FIG.9

| AGENT ID | SERVICE CATEGORY | INCIDENT ID | TRANSFER FLAG | DIFFICULTY LEVEL | RESPONSE TIME |
|---|---|---|---|---|---|
| OP001 | MEMBER MANAGEMENT | 5230002 | 1 | - | - |
| ... | ... | ... | ... | ... | ... |
| OP002 | INTERNET CONNECTION | 5230001 | 0 | E | 347 |
| ... | ... | ... | ... | ... | ... |
| OP003 | MEMBER MANAGEMENT | 5230003 | 0 | D | 661 |
| ... | ... | ... | ... | ... | ... |

FIG.10

| AGENT ID | SERVICE CATEGORY | EASY SKILL VALUE | DIFFICULT SKILL VALUE | TRANSFER RATE | EASINESS RATE | TOTAL SKILL VALUE | TRADITIONAL SKILL VALUE |
|---|---|---|---|---|---|---|---|
| OP001 | INTERNET CONNECTION | 100 | 60 | 30% | 80% | 79.6 | 92 |
| OP002 | INTERNET CONNECTION | 100 | 60 | 20% | 70% | 82.4 | 88 |
| OP003 | INTERNET CONNECTION | 100 | 80 | 10% | 60% | 92.6 | 92 |
| OP004 | INTERNET CONNECTION | 110 | 100 | 0% | 50% | 107 | 105 |
| ... | ... | ... | ... | ... | ... | ... | ... |

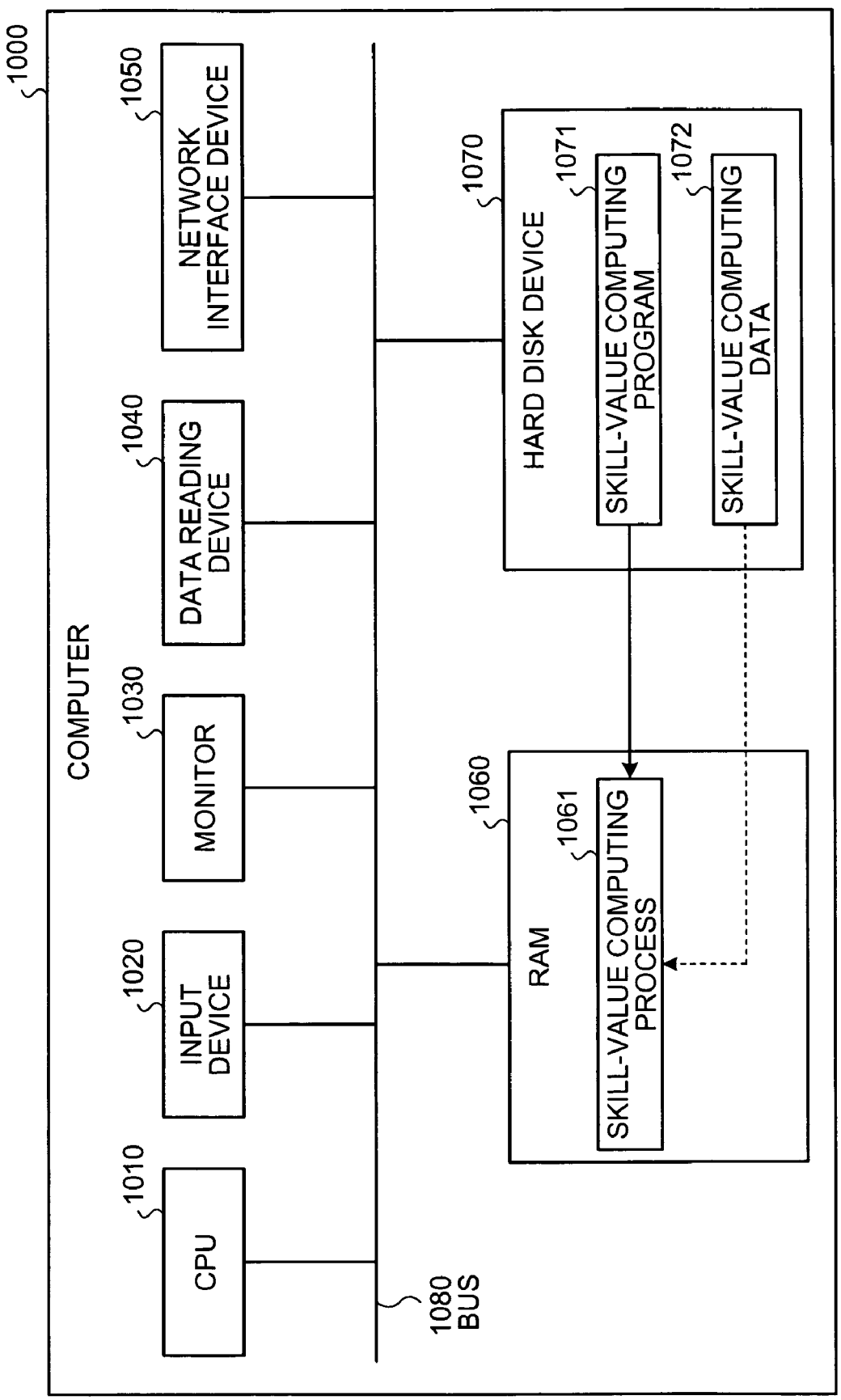

METHOD, APPARATUS, AND COMPUTER PRODUCT FOR COMPUTING SKILL VALUE

BACKGROUND OF THE INVENTION

1. Field of the Invention

The present invention generally relates to a technology for computing a skill value of an agent that responds to inquiries from customers.

2. Description of the Related Art

At contact centers (or call centers) agents respond to inquiries from customers via electronic mails or telephone. Administrators of such contact centers record handling time taken to respond to each inquiry, and calculate a skill value of each agent based on the handling time.

The agents are assigned tasks depending on their skills. The agents may be given training to improve their skills. The agents are treated differently depending on their skills, and thereby motivating the agents.

Japanese Patent Laid-Open No. 2005-258551 discloses a technique to acquire an accurate skill value of an agent. In the technique disclosed in Japanese Patent Laid-Open No. 2005-258551, however, the difficulty level of a task assigned to an agent is not taken into account. Generally, difficult tasks, which take longer time, are often assigned to agents having higher skills. Accordingly, if skill values are calculated from only the handling time, the result is not always accurate.

In the technique disclosed in Japanese Patent Laid-Open No. 2005-258551, moreover, transfer (also referred to as escalation) of tasks is not taken into account. In large contact centers, it is common to group the agents into a plurality of lines based on the skills of the agents. Supposing that there are three lines, front, middle, and back, then agents having lower skills are assigned to the front line, agents having intermediate skills are assigned to the middle line, and agents having higher skills are assigned to the back line. If a task is too difficult for an agent in a lower-level line such as the front line or the middle line, that task is transferred to a higher-level line such as the middle line or the back line.

In other words, agents in the lower-level lines take shorter time per task because they handle easier tasks, and the agents in the higher-level lines take longer time per task because they handle difficult tasks. As a result, if the skill values of the agents are calculated from only the handling times, the agent in the lower-level lines may acquire higher skill values than the agents in the higher-level lines, which makes the evaluation of skills of the agents difficult.

Thus, there is a need of a technique with which it is possible to calculate appropriate skill values.

SUMMARY OF THE INVENTION

It is an object of the present invention to at least partially solve the problems in the conventional technology.

According to an aspect of the present invention, a skill-value computing apparatus includes a classifying unit that classifies response data indicative of response made by an agent to an enquiry from a customer into first data corresponding to easy inquiries and second data corresponding to difficult inquiries; a counting unit that counts the number of the easy inquiries and the number of the difficult inquiries; and a computing unit that computes a total skill value of the agent based on a first skill value computed from the first data, a second skill value computed from the second data, and a ratio between the number of the easy inquiries and the number of the difficult inquiries.

According to another aspect of the present invention, a skill-value computing method includes classifying response data indicative of response made by an agent to an enquiry from a customer into first data corresponding to easy inquiries and second data corresponding to difficult inquiries; counting the number of the easy inquiries and the number of the difficult inquiries; and computing a total skill value of the agent based on a first skill value computed from the first data, a second skill value computed from the second data, and a ratio between the number of the easy inquiries and the number of the difficult inquiries.

According to still another aspect of the present invention, a computer-readable recording medium stores therein a computer program that causes a computer to execute the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic depicting the relation between the difficulty of the incidents and the rate of transfer;

FIG. 7 is an example of the contents of an incident data shown in FIG. 5;

FIG. 8 is an example of the contents of an incident classifying data shown in FIG. 5;

FIG. 9 is an example of the contents of an evaluation target data shown in FIG. 5;

FIG. 10 is an example of the contents of a skill data shown in FIG. 5;

FIG. 16 is a functional block diagram of a computer that executes a computer program for computing the skill value.

DETAILED DESCRIPTION OF THE PREFERRED EMBODIMENTS

Exemplary embodiments of the present invention are explained below in detail referring to the accompanying drawings. The present invention is not limited to the embodiments explained below.

Figure 1:
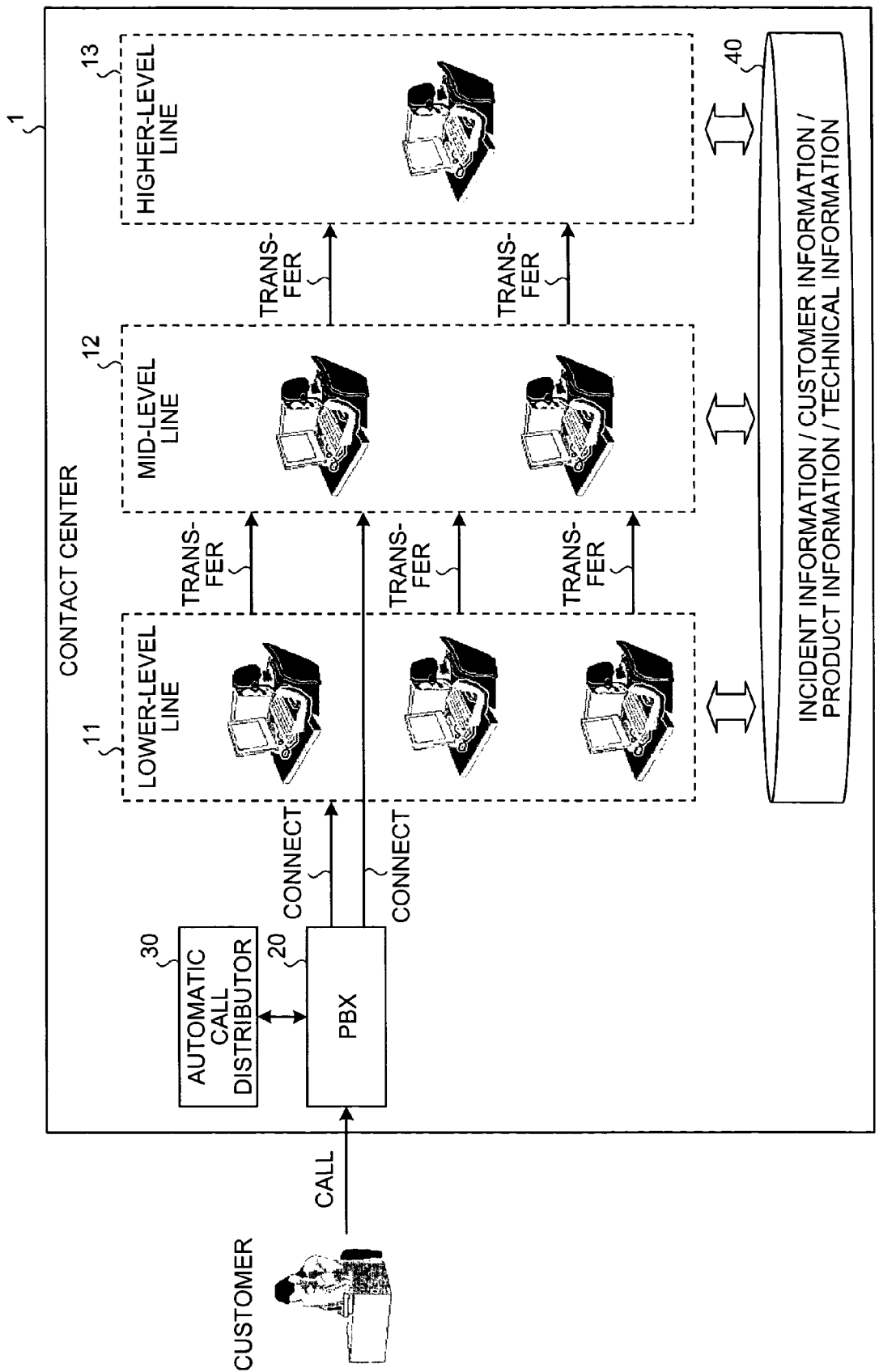
FIG. 1 is a schematic of a contact center according to an embodiment of the present invention.

FIG. 1 is a schematic of a contact center 1 according to an embodiment of the present invention. The contact center 1 includes a lower-level line 11, a mid-level line 12, and a higher-level line 13. Agents are assigned to each line depending on skills of the agents.

The contact center 1 includes a Private Branch exchange (PBX) 20 and an Automatic Call Distributor (ACD) 30. The PBX 20 assigns calls from customers to the agents. The ACD 30 determines to which agent the call is to be assigned so that the waiting time and the response time can be minimized.

Upon receiving a call from a customer, the PBX 20 inquires the ACD 30 to which agent the call is to be sent. The ACD 30 selects an agent in the lower-level line 11 who can answer the call at the soonest timing. If no such agent is available in the lower-level line 11, the ACD 30 selects an agent from the mid-level line 12.

The PBX 20 assigns the call to the terminal computer of the agent selected by the ACD 30. If the inquiry is too difficult for that agent, that agent transfers the call to an agent in the mid-level line 12. If the inquiry is difficult even for the agent in the mid-level line 12, that agent transfers the call to an agent in the higher-level line 13.

In this manner, difficult tasks are transferred to higher-level lines from lower-level lines.

Information such as incident information, customer information, product information, technical information is stored in a database 40. When responding an inquiry, agents can access the information in the database 40 from their terminal computers. The agents register in the database 40 information about the inquiry that the agent handled as the incident information.

An incident is the minimum unit of an inquiry, and refers to an independent issue included in the inquiry. For example, when the agent answers two questions in one inquiry, it is regarded that the agent responded to two incidents. The incident information is a record including identification information of the agent, contents of the incident, contents of the answer from the agent, a start time, and a finished time of the incident.

The incident information is recorded every time a new incident arises, and used by agents when they search for similar inquiries in the past. The contact center 1 can receive inquiries from customers by electronic mails as well as by the telephone calls. Information about the inquiries received by electronic mails is also recorded as the incident information.

The incident information is also used as the basic data for computing the skill value of an agent. A more skilled agent generally spends a shorter time to handle a single incident. The skill of the agent can be quantified by finding the response time from the record in the incident information and taking the statistics of the response time.

However, because a difficult incident is transferred from a lower-level line to a higher-level line, an agent in the higher-level line often handles more difficult incidents that require longer time. As a result, despite the capability, the skills of the agents in the higher-level lines are often evaluated lower when the evaluation is based on the handling time per incident.

To take care of this issue, administrators set a conversion factor for each line and calculate the skill values of the agents based on the handling time and the conversion factor. However, the resulting evaluation is not fair enough because some agents transfer many inquiries to the higher-level line and others rarely do.

The skill-value computing method according to an embodiment of the present invention takes into account the difficulty of each incident and the transfer rate in addition to the handling time for each incident.

Most inquiries are generally about a certain product or service, and many customers make similar inquiries. It is easy for an agent to handle an incident similar to one experienced in the past. On the contrary, it is difficult to handle an inquiry that the agent has not handled in the past. In other words, the difficulty of the incident mainly depends not on the technical level but on the frequency that the agent handled the similar incidents in the past. Stochastically, every incident is either a difficult incident or an easy incident.

The skill-value computing method according to the embodiment includes acquiring information of similar incidents that the same agent handled in the past; comparing the total number of the similar incidents or the total time spent to handle the incidents with a predetermined threshold; and determining that the incident is easy if the total number or time is equal to or more than the threshold.

Figure 2:
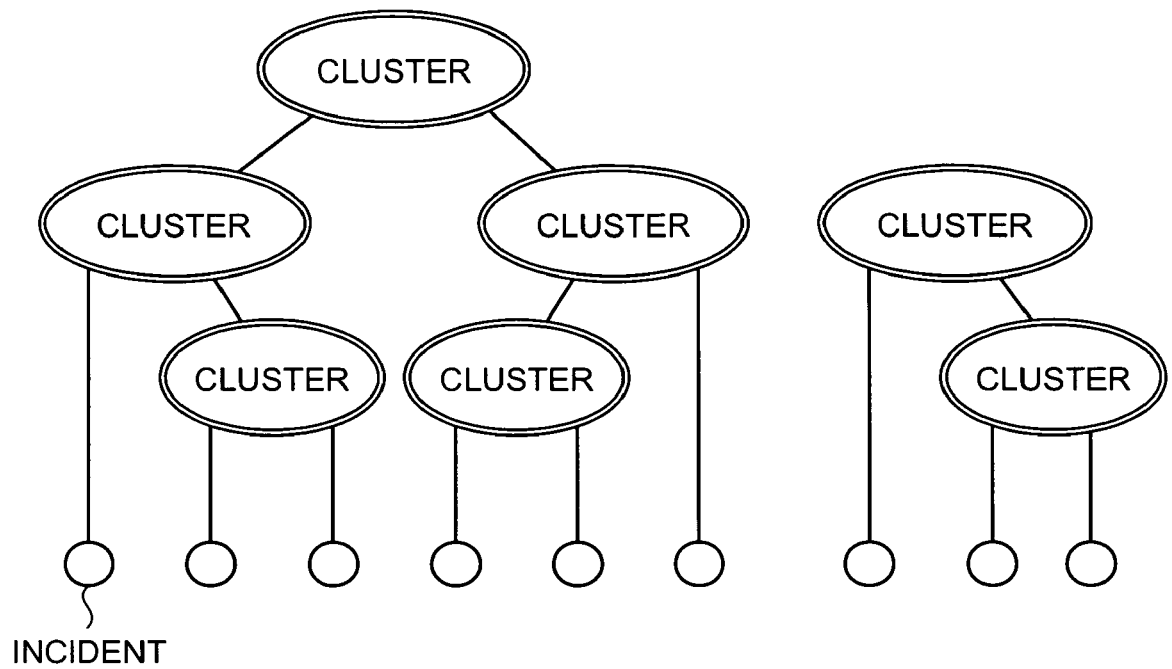
FIG. 2 is a schematic for explaining hierarchical clustering.

The skill-value computing method uses a clustering method to acquire the information of the similar incidents. FIG. 2 is an example of incidents clustered using a hierarchical clustering method. Incidents handled by the same agent are extracted from the incident information, and the most similar incidents are coupled to form a cluster. A general lexical analysis technology based on vector similarity can be used to determine the similarity of contents of incidents. In this manner, the most similar incidents or clusters are coupled to form a cluster tree.

The clustering stops when a predetermined stopping condition is satisfied. Specifically, the clustering stops when the similarity of the incidents or clusters is smaller than the predetermined threshold, or when the number of incidents in a cluster reaches the predetermined threshold.

Similar incidents form a single cluster tree in this process. The difficulty level of the incident can be determined by totaling the number of or time spent to handle older incidents in the same cluster tree.

After the completion of classifying the incidents by the difficulty thereof, the agent's skill value in handling easy incidents and that in handling difficult incidents can be computed. Moreover, a ratio between easy incidents and difficult incidents that an agent handled without transferring the inquiry can be computed.

Figure 3A:
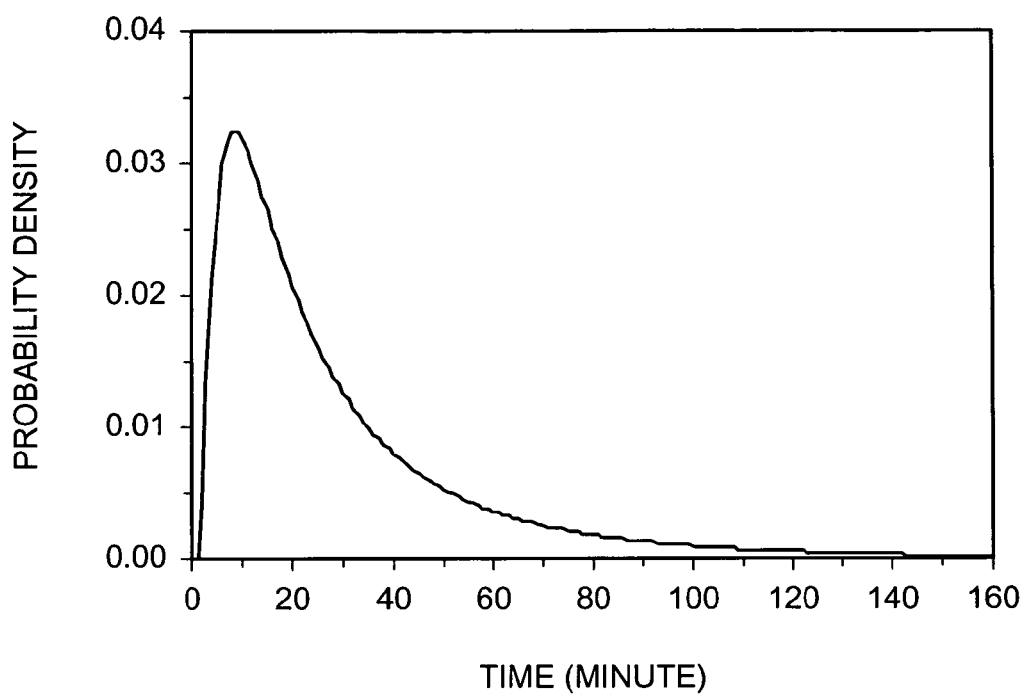
FIG. 3A is a chart of distribution of time to respond to an easy incident.

The method disclosed in Japanese Patent Laid-Open No. 2005-258551 or some other method can be used to compute skill values. More specifically, the distribution of the total response time of each agent and all agents with easy incidents is assumed as shown in FIG. 3A, and respective averages of the assumed response time of each agent and all the agents are figured out. Based on the ratio between the averages of the assumed response time of each agent and all the agents, each agent's skill value in handling easy incidents can be computed.

Figure 3B:
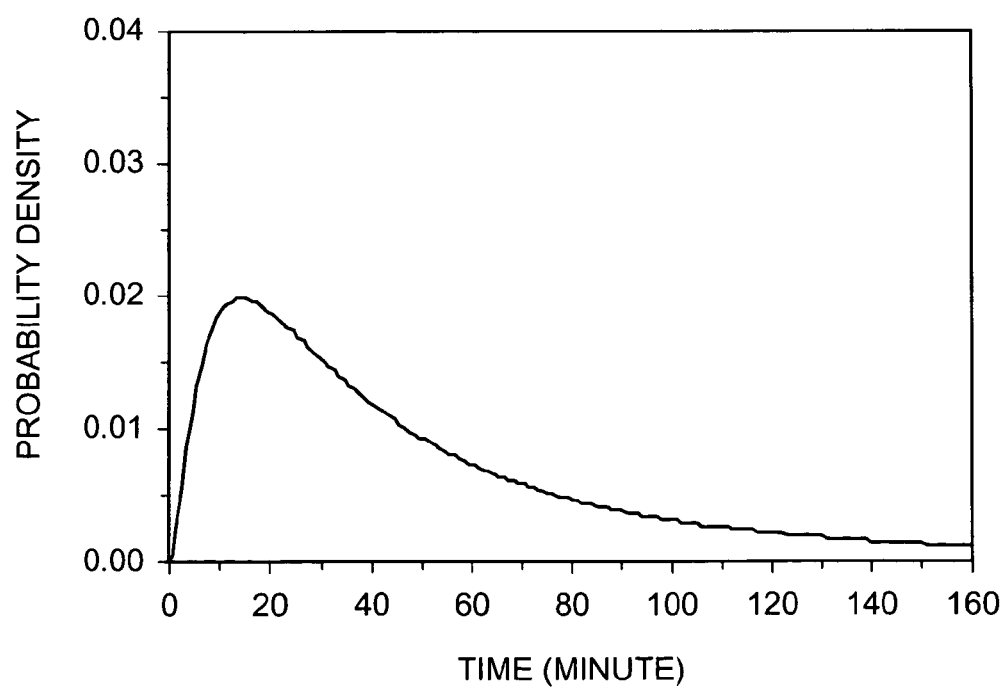
FIG. 3B is a chart of distribution of time to respond to a difficult incident.

Similarly, the distribution of the total response time of each agent and all agents with difficult incidents is assumed as shown in FIG. 3B, and respective averages of the assumed response time of each agent and all the agents are figured out. Based on the ratio between the averages of the assumed response time of each agent and all the agents, each agent's skill value in handling difficult incidents can be computed.

FIG. 4 is a schematic depicting the relation between the difficulty of the incidents and the rate of the transfer. Incidents assigned to the agent are separated into a group of incidents transferred to another agent and a group of self-handled incidents.

All of the transferred incidents can be regarded as incidents difficult for the agent. On the other hand, the self-handled incidents include both incidents that are easy for the agent and incidents that are difficult for the agent and the agent tried very hard to handle.

Assuming that the rate of the transferred incidents is r and that the rate of the easy incident among the self-handled incidents is α, the rate of the difficult incidents among all the incidents assigned to the agent is expressed by $(1-r) \times (1-\alpha) + r$, and the rate of the easy incident is expressed by $(1-r) \times \alpha$.

The rates of difficult incidents and easy incidents are in the case where no incidents are transferred. The rates remain almost constant for agents with the same level of the skill, no matter to which line the agent belongs and no matter what the rate of transfer is.

By combining the skill value in handling difficult incidents and the skill value in handling easy incidents according to the ratio between them, a skill value that properly reflects the transfer rate and the ratio between difficult and easy incidents can be computed. A general equation to figure the skill value S of the agent is shown below.

$$S = W_a(r,\alpha,\beta,\sigma) \times S_a + W_b(r,\alpha,\beta,\sigma) \times S_b \quad (1)$$

β is the average rate of the easy incidents assigned to each agent, and σ is the standard deviation thereof. $S_a$ is the skill value in handling the difficult incidents, and $S_b$ is the skill value in handling the easy incidents. $W_a$ and $W_b$ are weighting functions using r, α, β, and σ as parameters.

The parameters include β and σ to prevent the rate of easy incidents of the agent in the higher-level lines from fluctuating depending on how many of difficult incidents the agents in the lower-level lines transfer.

The Equation 1 can be modified based on the ratios shown in FIG. 4 as follows:

$$S = (1-r) \times \alpha \times S_a + \{(1-r) \times (1-\alpha) + r\} \times S_b \quad (2)$$

To exclude a possibility of fluctuation of the rate of easy incidents of the agent in the higher-level lines, β can be used instead of α in Equation 2 as shown below:

$$S = (1-r) \times \beta \times S_a + \{(1-r) \times (1-\beta) + r\} \times S_b \quad (3)$$

Furthermore, Equation 3 can be modified as below by taking into account the standard deviation:

$$S = (1-r) \times (\beta \pm \sigma) \times S_a + \{(1-r) \times (1-(\beta \pm \sigma)) + r\} \times S_b \quad (4)$$

Figures 5, 6:
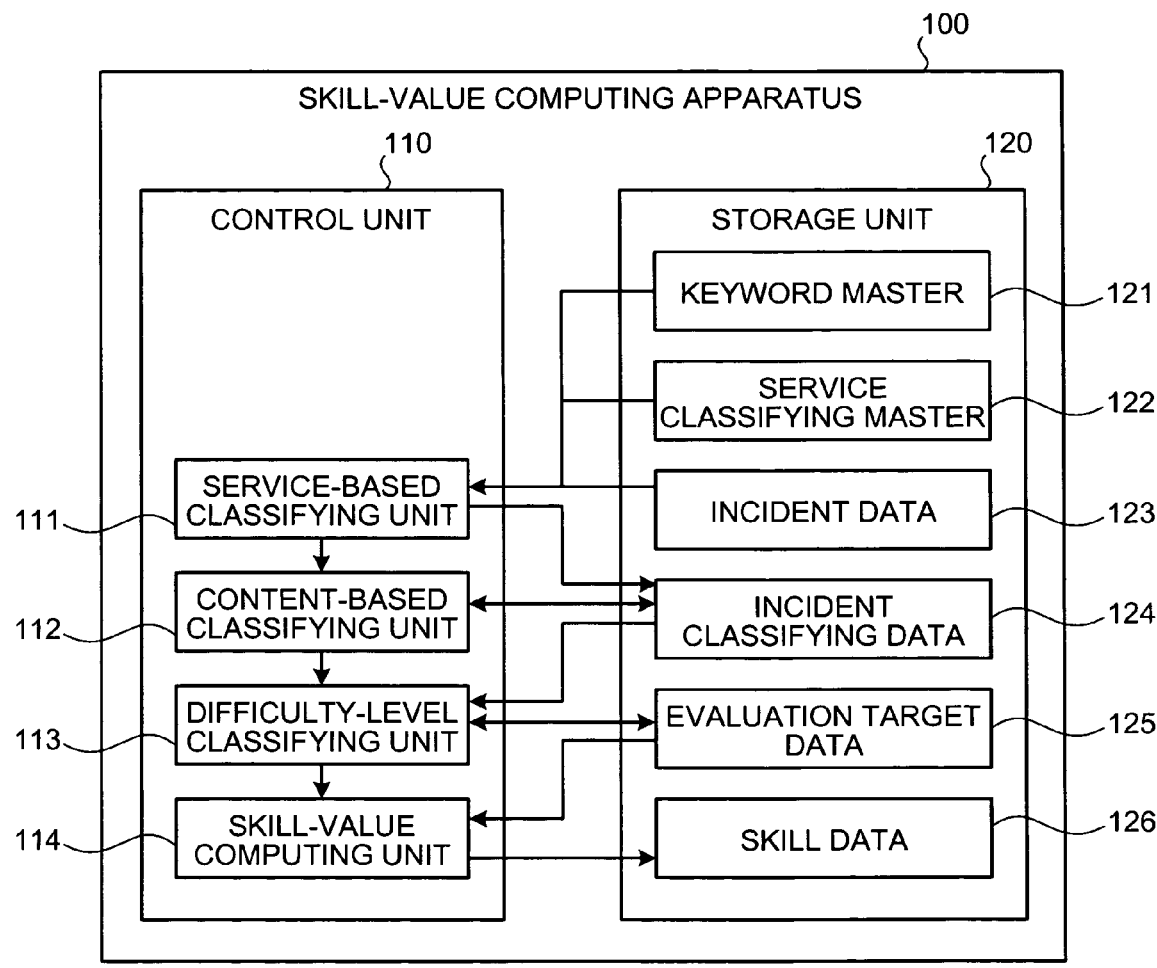
FIG. 5 is a functional block diagram of a skill-value computing apparatus according to the embodiment of the present invention.
FIG. 6 is an example of the contents of a service classifying master shown in FIG. 5.

FIG. 5 is a functional block diagram of a skill-value computing apparatus 100 according to the embodiment. The skill-value computing apparatus 100 includes a control unit 110 and a storage unit 120.

The control unit 110 controls the skill-value computing apparatus 100 in general, and includes a service-based classifying unit 111, a content-based classifying unit 112, a difficulty-level classifying unit 113, and a skill-value computing unit 114.

The service-based classifying unit 111 classifies incidents by specific service categories. More specifically, the service-based classifying unit 111 extracts keywords registered to a keyword master 121 from texts indicating contents of inquiry and texts indicating contents of answer that are stored in each of incident data 123 in the storage unit 120. The service-based classifying unit 111 compares the extracted keywords with classification rules in a service classifying master 122, and classifies the incident into the most suitable service category.

By classifying incidents into service categories, each agent's skill value can be computed with respect to each service category. The classification can also reduce a risk that the content-based classifying unit 112 erroneously treats different inquiries as the similar ones.

The content-based classifying unit 112 acquires the data of the incidents classified into service categories from an incident classifying data 124 in the storage unit 120; produces clusters based on the similarity of the contents with respect to each agent and each service category; and records which data belongs to which cluster to the incident classifying data 124.

The difficulty-level classifying unit 113 classifies each of the incident classifying data 124 into either group of difficult incidents or easy incidents based on the number of older incidents in a cluster.

The difficulty-level classifying unit 113 separates data of only the incidents arose during a predetermined evaluation target period based on the difficulty levels among the incident classifying data 124. Because the difficulty level of the incident is determined based on the number of older incidents in the same cluster, the skill-value computing method according to the embodiment requires that the clustered data include the data older than the evaluation target period; however, the difficulty of the data before or after the evaluation target period is not used to compute the skill value.

The skill-value computing unit 114 figures the transfer rate of the incidents, the rate of easy incidents and the like during the evaluation target period with respect to each agent and each service category, and inputs the values to the equations to compute the skill value.

The storage unit 120 stores therein various information, and includes the keyword master 121, the service classifying master 122, the incident data 123, the incident classifying data 124, an evaluation target data 125, and a skill data 126. The keyword master 121 includes keywords used to extract important words that can be used for the category-based classification and the comparison of the contents from the texts.

The service classifying master 122 includes identification names of the service categories in association with the classification rules used for the classification. FIG. 6 is an example of the contents of the service classifying master 122. The service classifying master 122 includes information such as the service category and the classification rule, and registers data with respect to each service category.

The service category includes names of the service categories, and the classification rule includes classification rules used to classify the incidents into the service categories. In the classification rule, keywords can be connected by & in between to form a matching condition, and a plurality of the matching conditions can be arranged in a row with a comma in between.

As shown in FIG. 6, the service classifying master 122 includes INTERNET CONNECTION as the service category and INTERNET & CONNECTION as the classification rule. This means that any incident that includes both keywords INTERNET and CONNECTION in the contents of the inquiry or answer is classified into the service category of INTERNET CONNECTION.

The service classifying master 122 further includes MEMBERSHIP MANAGEMENT as the service category and SIGN-UP & OFFER, CANCELLATION as the classification rule. This means that any incident that includes both SIGN-UP and OFFER or CANCELLATION in the contents of the inquiry or answer is classified into the service category of MEMBERSHIP MANAGEMENT.

The incident data 123 includes information of incidents handled by the agent. FIG. 7 is an example of the contents of the incident data 123. The incident data 123 includes incident identification (ID), agent ID, transferred incident ID, response start time, response finished time, contents of inquiry, and contents of answer. The data is registered with respect to each incident.

The incident ID includes an ID number of each incident, and the agent ID includes an ID number of an agent that handled the incident. The transferred incident ID includes an ID number of a transferred incident. An agent in a lower-level line transfers an incident to an agent in a higher-level line if he is not able to handle it. When an incident has a transferred incident ID, it means that that incident was transferred to an agent from another agent. On the contrary, when an incident has only incident ID, i.e., no transferred incident ID, it means that that incident was handled all the way by the agent indicated by the agent ID.

The response start time includes the date and time when the response to the incident started, and the response finished time includes the date and time when the response to the incident finished. The contents of inquiry includes text data indicative of contents of the inquiry from the customer, and the contents of answer includes text data indicative of what the agent answered to the inquiry.

The incident classifying data 124 includes information of incidents classified into service categories. FIG. 8 is an example of the contents of the incident classifying data 124. The incident classifying data 124 includes incident ID, agent ID, transferred incident ID, response start time, response finished time, list of inquired words, service category, and cluster ID. Each data corresponds to one of the data in the incident data 123.

The items from incident ID to response finished time in the incident data 123 are copied to the incident classifying data 124.

The list of inquired words enlists the result of extracting words that match any keywords in the keyword master 121 from the text data of the inquiry in the corresponding incident data. For example, ((INTERNET, 1)(CONNECTION, 1)) in the first row indicates that the text data of the inquiry in the corresponding incident data includes a single word of INTERNET and a single word of CONNECTION.

The list of answered words enlists the result of extracting words that match any keywords in the keyword master 121 from the text data of the answer in the corresponding incident data. For example, ((LAN CABLE, 2)(CONNECTION, 3)) in the first row indicates that the text data of the answer in the corresponding incident data includes two words of LAN CABLE and three words of CONNECTION.

The service category includes the name of the service category that best matches the values in the list of inquired words and the list of answered words based on the classification rules. The cluster ID is set by the content-based classifying unit 112, and the cluster ID is an ID number of a cluster at the top of the cluster hierarchy formed on the basis of the similarity of values in the list of inquired words and the list of answered words.

The evaluation target data 125 includes information of incidents that arose during the evaluation target period. The information is registered by the difficulty-level classifying unit 113. FIG. 9 is an example of the contents of the evaluation target data 125. The evaluation target data 125 includes agent ID, service category, incident ID, transfer flag, difficulty level, and response time. The data is registered with respect to each incident.

The items from agent ID to incident ID in the incident classifying data 124 are copied to the evaluation target data 125. The transfer flag includes a value indicative of whether the incident was transferred to another agent. When the transfer flag is one, the corresponding incident was transferred to another agent. When the transfer flag is zero, the incident was not transferred.

The difficulty level includes a value indicative of whether the incident is easy or difficult. When the difficulty level is D, the corresponding incident is difficult. When the difficulty level is E, the corresponding incident is easy. The response time includes a handling time required to handle the incident. The handling time can be in seconds or minutes.

The skill data 126 includes information on the skill of each agent registered by the skill-value computing unit 114 with respect to each service category. FIG. 10 is an example of the contents of the skill data 126. The skill data 126 includes agent ID, service category, easy skill value, difficult skill value, transfer rate, easiness rate, and total skill value. This example also includes the skill value computed based on the existing technique for reference.

The agent ID includes the ID number of each agent, and the service category includes the name of the service category. The easy skill value includes a skill value of the agent in handling the easy incidents, and the difficult skill value includes a skill value of the agent in handling the difficult incidents.

The transfer rate includes a value indicative of the rate of incidents transferred to another agent. The easiness rate includes a value indicative of the rate of easy incidents among the self-handled incidents. The total skill value includes the skill value figured by inputting the easy skill value, the difficult skill value, the transfer rate, the easiness rate, and the like of the identical data to the equations.

Figure 11:
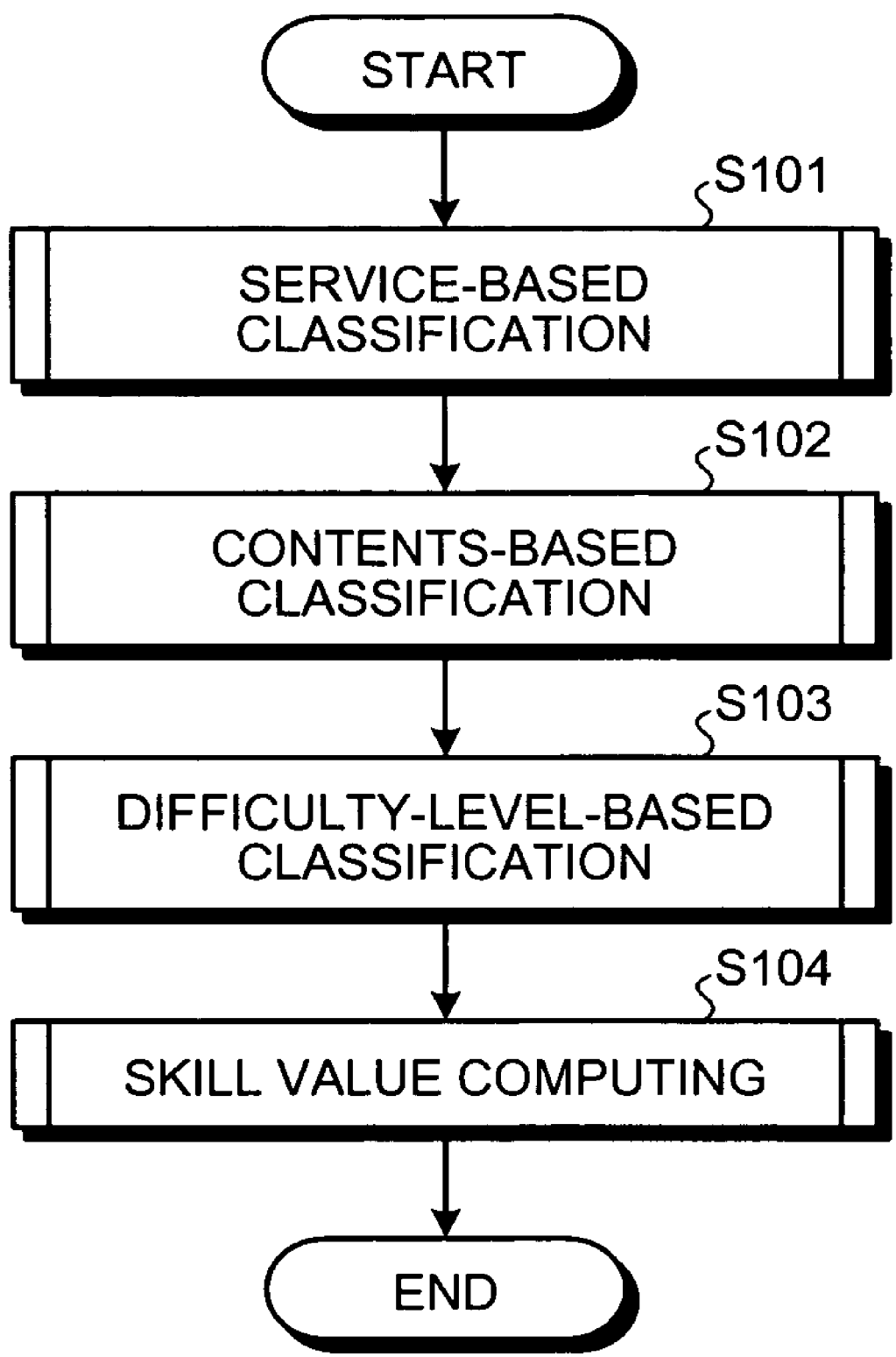
FIG. 11 is a flowchart of a process performed by the skill-value computing apparatus.

FIG. 11 is a flowchart of a process performed by the skill-value computing apparatus 100. When the evaluation target period, stop condition of the clustering, threshold for determining difficulty, and the like are specified, then the skill-value computing apparatus 100 calculates the skill value. Precisely, the service-based classifying unit 111 performs a service-based classification process (step S101), the content-based classifying unit 112 performs a contents-based classification process (step S102), the difficulty-level classifying unit 113 performs a difficulty-level-based classification process (step S103), and the skill-value computing unit 114 performs a skill value computing process for the corresponding agent (step S104).

Figure 12:
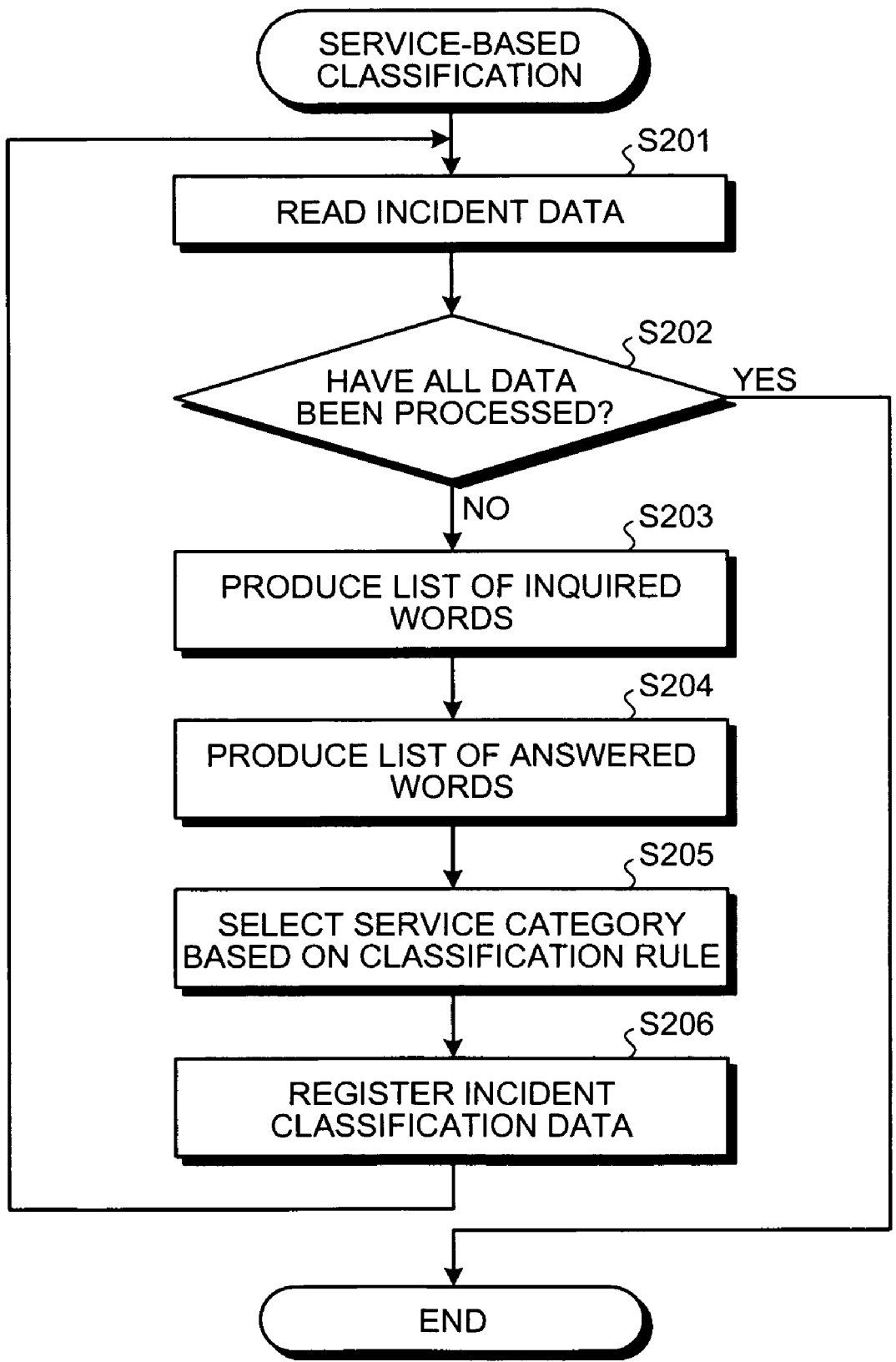
FIG. 12 is a flowchart of a service-based classification process shown in FIG. 11.

FIG. 12 is a flowchart of the service-based classification process. The service-based classifying unit 111 reads a piece of data from the incident data 123 (step S201). If all of the data have already been processed (YES at step S202), the service-based classifying unit 111 terminates the process and transfers control to the content-based classifying unit 112.

When the service-based classifying unit 111 reads unprocessed data from the incident data 123 (NO at step S202), the service-based classifying unit 111 extracts words that match any of the keywords in the keyword master 121 from texts indicating contents of inquiries and produces a list of inquired words (step S203). The service-based classifying unit 111 also extracts words that match any of the keywords in the keyword master 121 from texts indicating contents of answers and produces a list of answered words (step S204).

The service-based classifying unit 111 compares the list of answered words with the classification rules in the service classifying master 122, and selects a service category corresponding to the best matched classification rule (step S205). After registering the results to the incident classifying data 124 (step S206), the service-based classifying unit 111 tries to read another data returning to the process at the step S201.

Figure 13:
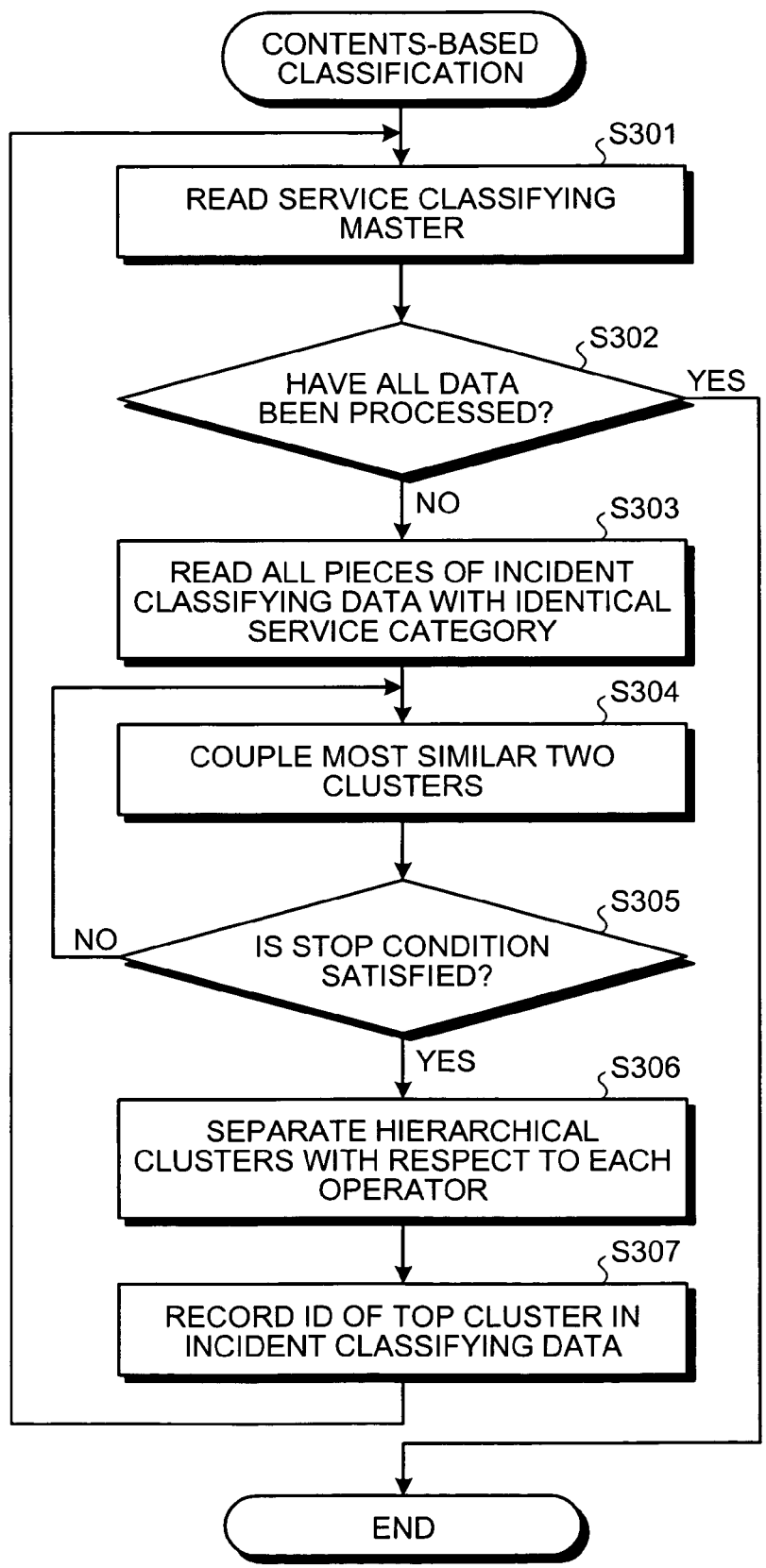
FIG. 13 is a flowchart of a content-based classification process shown in FIG. 11.

FIG. 13 is a flowchart of the content-based classification process. The content-based classifying unit 112 reads a piece of data from the service classifying master 122 (step S301). If all of the data have already been processed (YES at step S302), the content-based classifying unit 112 terminates the process and transfers control to the difficulty-level classifying unit 113.

When the content-based classifying unit 112 reads unprocessed data from the service classifying master 122 (NO at step S302), the content-based classifying unit 112 reads all the data in an identical service category from the incident classifying data 124 (step S303). The content-based classifying unit 112 couples the most similar data in a hierarchical form based on the similarity to the list of inquired words and the list of answered words and produce a hierarchical cluster (step S304) while the predetermined stop condition is not satisfied (NO at step S305).

When the stop condition such as the level of similarity or the number of data in the cluster is satisfied (YES at step S305), the content-based classifying unit 112 separates each cluster hierarchy with respect to each agent (step S306). After the content-based classifying unit 112 records the ID number of the cluster at the top of each separated cluster hierarchy in each piece of the incident classifying data 124 (step S307), the content-based classifying unit 112 tries to select another couple returning to the process at the step S301.

Figure 14A:
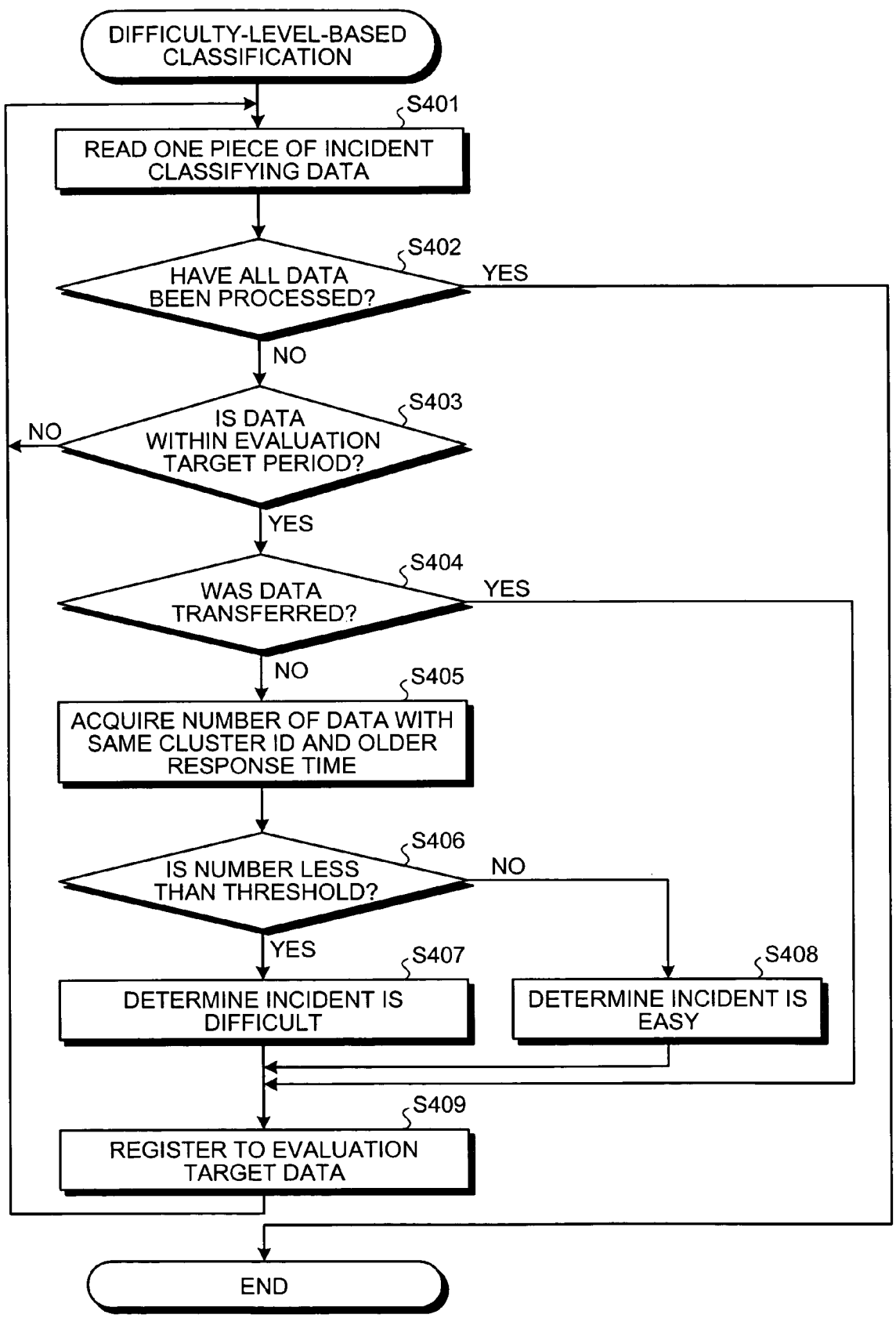
FIG. 14A is a flowchart of a difficulty-level-based classification process shown in FIG. 11.

FIG. 14A is a flowchart of the difficulty level classification process. The difficulty-level classifying unit 113 reads a piece of data from the incident classifying data 124 (step S401). If all of the data have already been processed (YES at step S402), the difficulty-level classifying unit 113 terminates the process and transfers control to the skill-value computing unit 114.

When the difficulty-level classifying unit 113 reads unprocessed data from the incident classifying data 124 (NO at step S402), the difficulty-level classifying unit 113 determines whether the response start time or the response finished time of the data is within the predetermined evaluation target period. When neither of the response start time or the response finished time is within the evaluation target period (NO at step S403), the difficulty-level classifying unit 113 tries to read another data returning to the process at step S401.

When either one or both of the response start time and the response finished time is included in the evaluation target period (YES at step S403), the difficulty-level classifying unit 113 refers to the transferred incident ID to determine whether the incident corresponding to the data was transferred to another agent.

If the incident was transferred to another agent (YES at step S404), the difficulty-level classifying unit 113 registers the data that indicates one in the transfer flag and no value in the difficulty level to the evaluation target data 125 (step S409), and tries to read another data returning to the process at the step S401.

If the incident was not transferred to another agent (NO at step S404), the difficulty-level classifying unit 113 acquires the number of data that have the same cluster ID and the response start time older than that of the data being processed from the incident classifying data 124 (step S405).

If the acquired number is less than the predetermined threshold (YES at step S406), the difficulty-level classifying unit 113 determines that the incident corresponding to the data is difficult (step S407). If the acquired number is equal to or more than the predetermined threshold (NO at step S406), the difficulty-level classifying unit 113 determines that the incident is easy (step S408). The difficulty-level classifying unit 113 then inputs zero to the cell of the transfer flag, registers a data that indicates a value reflecting the determination in the difficulty level to the evaluation target data 125 (step S409), and tries to read another data returning to the process at the step S401.

Figure 14B:
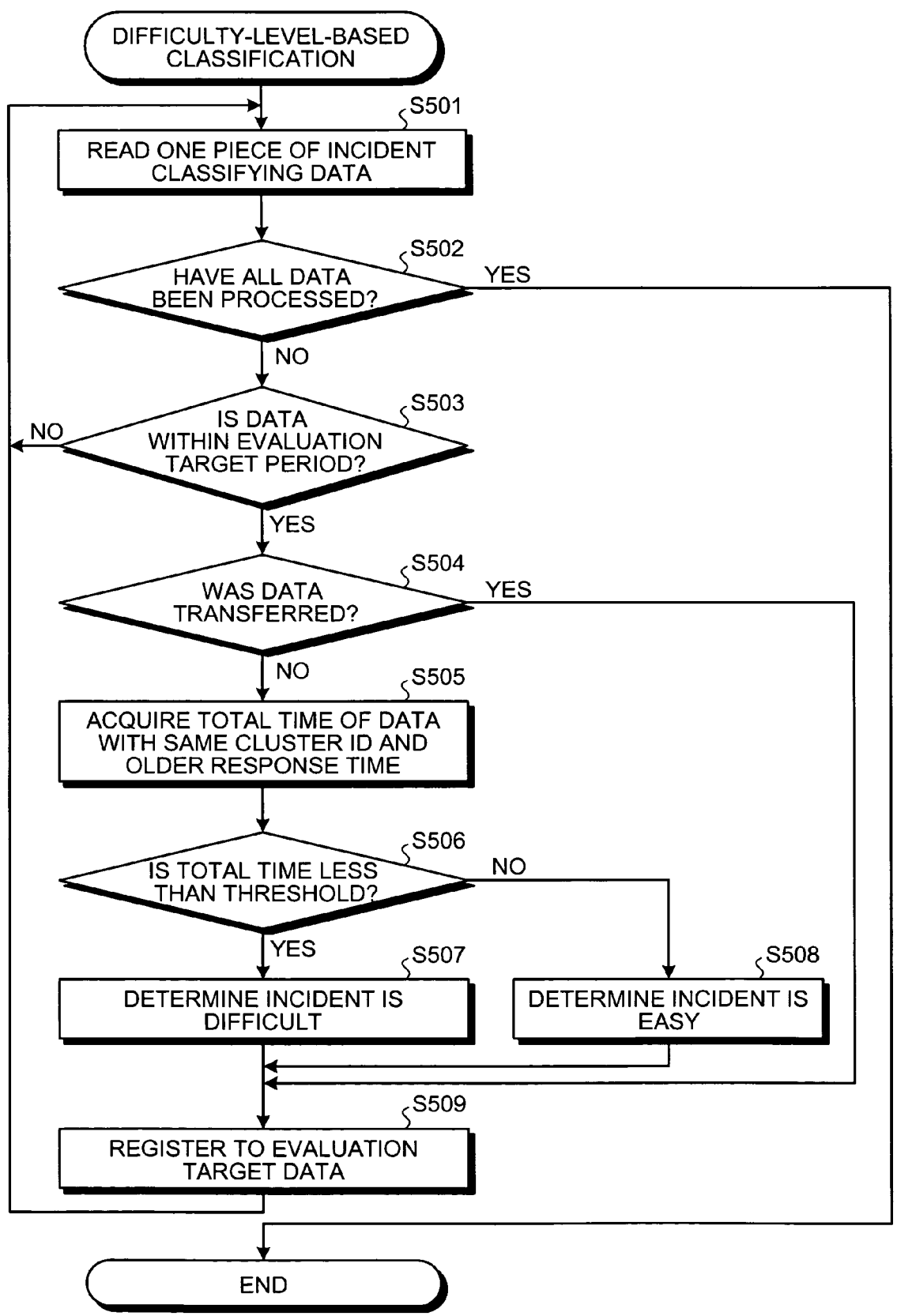
FIG. 14B is a flowchart of a the difficulty-level-based classification process based on the response time.

While FIG. 14A is the flowchart of the process to determine the difficulty level of the incident based on the number of the similar incidents handled in the past, the determination can be performed based on the total time spent to handle the similar incidents in the past. FIG. 14B is a flowchart of the difficulty level classification process based on the total response time of the similar incidents handled in the past.

Only the steps different from the process shown in FIG. 14A are explained below. If the incident was not transferred to another agent (NO at step S504), the difficulty-level classifying unit 113 acquires the total response time of data that have the same cluster ID and the response start time older than that of the data being processed from the incident classifying data 124 (step S505).

If the acquired total response time is less than the predetermined threshold (YES at step S506), the difficulty-level classifying unit 113 determines that the incident corresponding to the data is difficult (step S507). If the acquired total response time is equal to or more than the predetermined threshold (NO at step S506), the difficulty-level classifying unit 113 determines that the incident is easy (step S508).

Figure 15A:
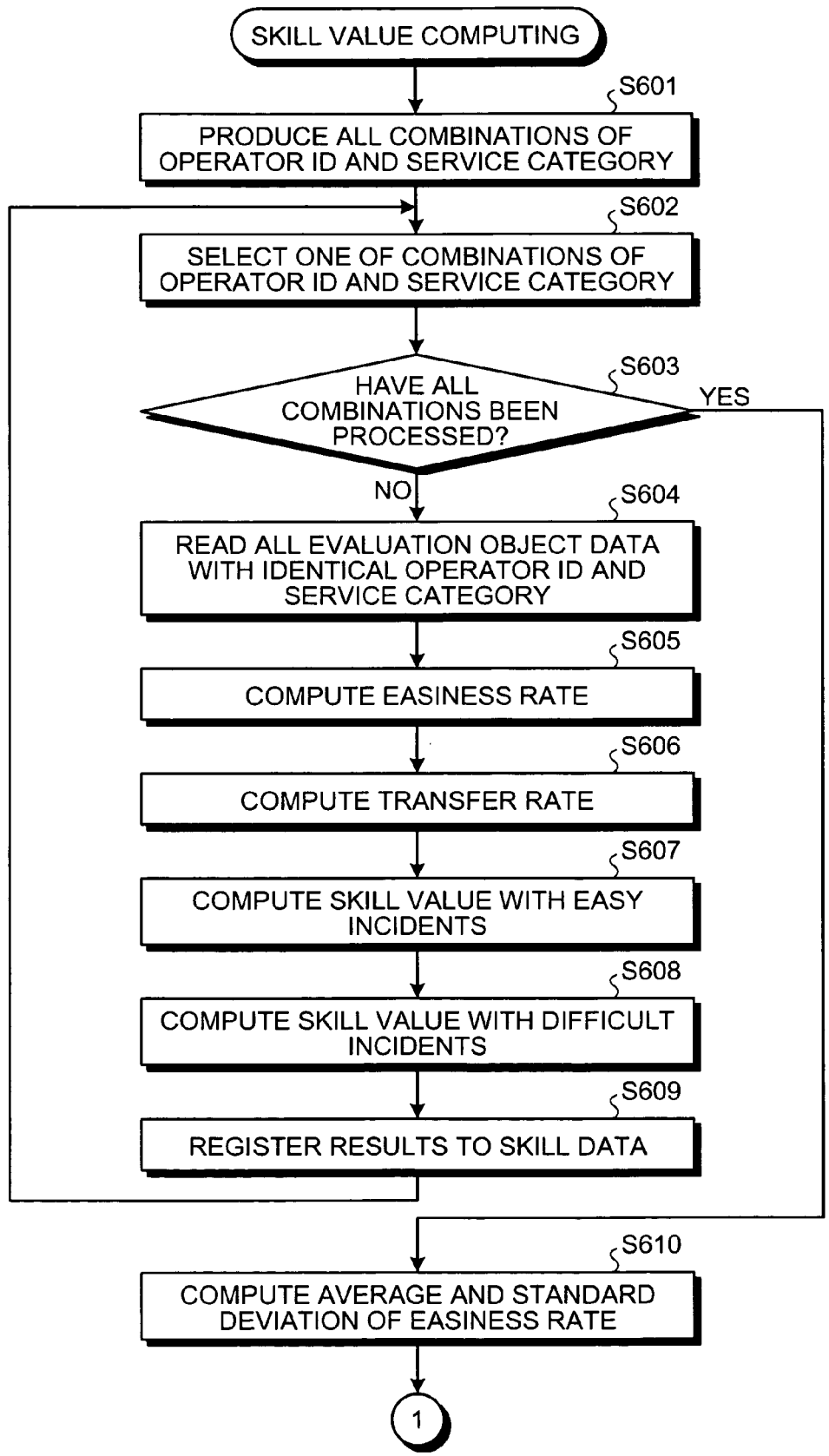
FIGS. 15A and 15B are flowcharts of a skill value computing process shown in FIG. 11.
Figure 15B:
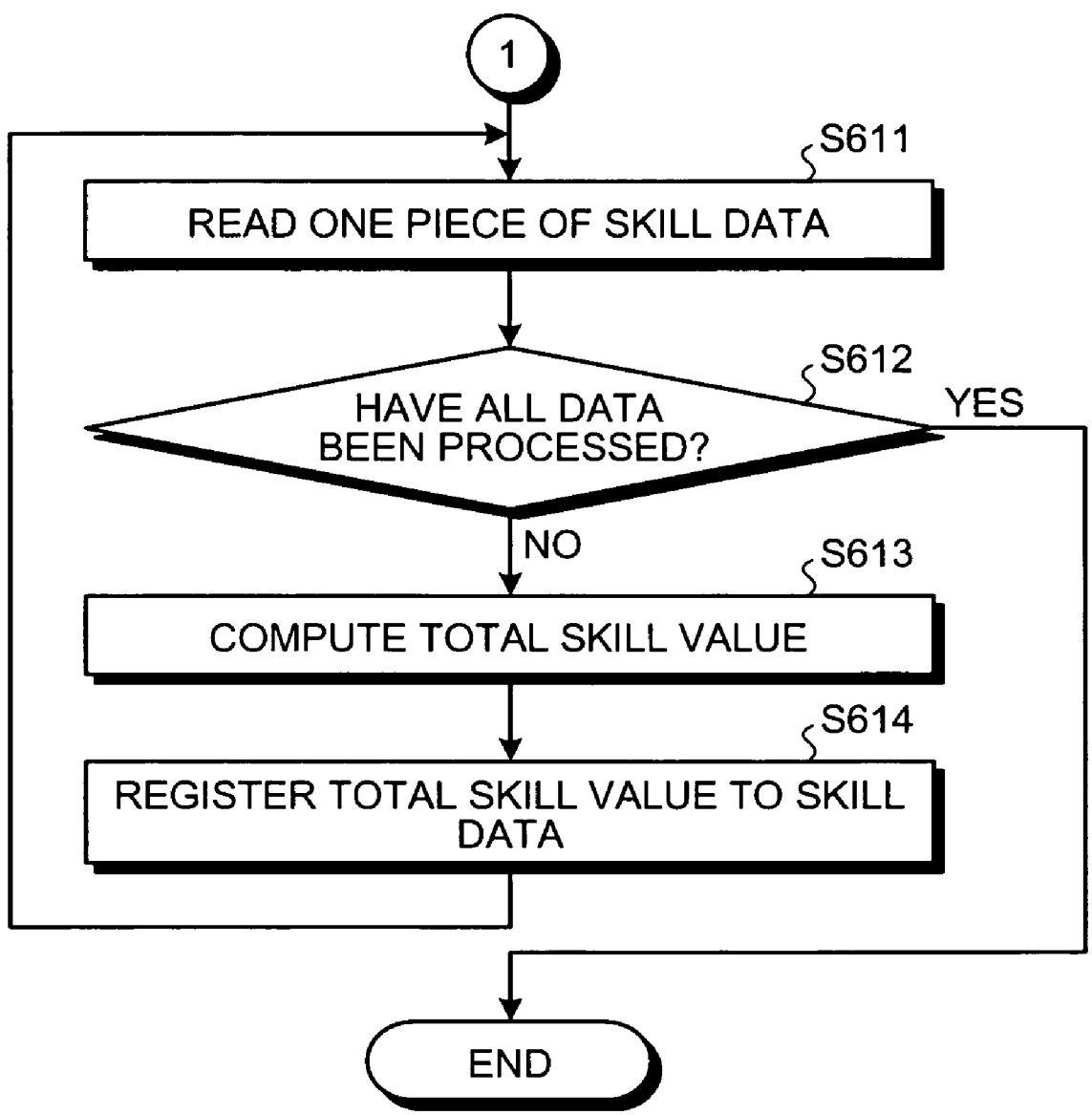

FIGS. 15A and 15B are flowcharts of the skill value computing process. The skill-value computing unit 114 produces all combinations of an agent ID and a service category each based on the evaluation target data 125 (step S601).

The skill-value computing unit 114 selects one of the produced combinations (step S602). If all of the combinations have already been processed (YES at step S603), the process jumps to the step S610.

When the skill-value computing unit 114 selects an unprocessed combination (NO at step S603), the skill-value computing unit 114 reads all the data that have the identical agent ID and the identical service category from the evaluation target data 125 (step S604). The skill-value computing unit 114 computes the easiness rate, or the rate of the data whose difficulty level is E among the data whose value in the transfer flag is zero (step S605). The skill-value computing unit 114 also computes the transfer rate, or the rate of the data whose value in the transfer flag is one among all the data having the same agent ID (step S606).

Furthermore, the skill-value computing unit 114 computes the skill value in handling easy incidents based on the response time and the like of the data whose difficulty level is E (step S607), and computes the skill value in handling difficult incidents based on the response time and the like of the data whose difficulty level is D (step S608). After registering the results to the skill data 126 (step S609), the skill-value computing unit 114 tries to select another combination returning to the process at the step S602.

After handling all of the combinations in this manner, the skill-value computing unit 114 computes the average and the standard deviation of the easiness rate among all agents (step S610). The skill-value computing unit 114 reads a piece of data from the skill data 126 (step S611). When all of the data are processed (YES at step S612), the skill-value computing unit 114 terminates the process.

When the skill-value computing unit 114 reads an unprocessed data from the skill data 126 (NO at step S612), the skill-value computing unit 114 computes the total skill value by inputting the skill value in handling easy incidents, the skill value in handling difficult incidents, the transfer rate, the easiness rate of the target data, and the average and the standard deviation of the easiness computed at the step S610 to any one of the equations (step S613). The skill-value computing unit 114 registers the computed total skill value to the skill data 126 (step S614), and tries to read another data returning to the process at the step S611.

The example of the skill data 126 shown in FIG. 10 includes the results acquired through the process described above. The skill values are computed using the equation (3) assuming that the average easiness rate is 70%.

The skill of an agent identified by OP001 in the first row and that of another agent identified by OP002 in the second row are equal in handling both easy and difficult incidents. The transfer rate of the agent OP001 is 30%, and that of the agent OP002 is 20%.

In this case, the agent OP001 spends shorter response time per incident, and the skill of the agent is more highly evaluated using the traditional skill-value computing method that does not consider the transfer rate and the easiness rate (the traditional skill value matches the equation $\alpha \times S_a + (1-\alpha) \times S_b$ according to this embodiment). On the contrary, the skill-value computing method according to the embodiment of the present invention evaluates the skill of the agent OP002 higher than that of the agent OP001. Furthermore, while the traditional method evaluates the skill of the agent OP001 equal to that of an agent OP003, the method according to the embodiment evaluates the skill of the agent OP003 much higher. In this manner, appropriate skill values can be acquired without correcting values using any arbitrary conversion factors.

The functions of the skill-value computing apparatus 100 can be realized by executing a computer program on a computer.

FIG. 16 is a functional block diagram of a computer 1000 that executes a skill value computing program 1071. The computer 1000 includes a central processing unit (CPU) 1010, an input device 1020, a monitor 1030, a data reading device 1040, a network interface device 1050, a random access memory (RAM) 1060, and a hard disk device 1070, all of which connected via a bus 1080.

The CPU 1010 executes various operations. The input device 1020 accepts input of data from a user. The monitor 1030 displays a variety of information. The data reading device 1040 reads programs and the like recorded on a recording medium. The network interface device 1050 exchanges data with other computers via a network. The RAM 1060 temporarily stores therein the variety of information.

The hard disk device 1070 stores therein the skill-value computing program 1071 that functions as the control unit 110, and a skill-value computing data 1072 that corresponds to the keyword master 121, the service classifying master 122, the incident data 123, the incident classifying data 124, the evaluation target data 125, and the skill data 126.

The CPU 1010 reads the skill-value computing program 1071 from the hard disk device 1070 and deploys it to the RAM 1060, whereby the skill-value computing program 1071 functions as a skill-value computing process 1061. The skill-value computing process 1061 deploys information and the like read from the skill-value computing data 1072 to an area allocated to itself on the RAM 1060 as needed, and executes various data processes based on the deployed data.

The skill-value computing program 1071 does not necessarily have to be stored in the hard disk device 1070. The computer 1000 can read and execute the skill-value computing program 1071 from a recording medium such as a CD-ROM. The skill-value computing program 1071 can be stored also in another computer or server connected to the computer 1000 via a public line, the Internet, a local area network (LAN), a wide area network (WAN), or the like, and the computer 1000 can read and execute the skill-value computing program 1071 from the other computer or server.

According to an aspect of the present invention, each incident data is classified by the difficulty of the incident, and the total skill value of each agent is computed based on the skill value by the difficulty level and the ratio between the numbers of easy incidents and difficult incidents. In this manner, the skill value of the agent can be correctly computed even if the ratio between the easy incidents and difficult incidents varies among agents.

Moreover, the data included in the record of responses are grouped by the similarity of the contents, and the data handled in early times are classified as data of difficult incidents in the group. As a result of the grouping, the data can be correctly classified as the data of difficult or easy incident based on the nature of the contact center that the more of similar inquiries are handled, the easier the handling of the sort of inquiries become.

Furthermore, the data included in the record of responses are grouped by the similarity of the contents, and the data in a group whose total response time is less than a predetermined time is classified as the data of a difficult incident. This also provides the advantage that the data can be correctly classified by the difficulty level.

Moreover, an incident transferred to another agent is regarded as a difficult incident, and the total skill value of the agent is computed assuming a case where no incident was transferred. In this manner, the skill value of the agent can be correctly computed even if the ratio between the easy incidents and difficult incidents varies among agents or line groups.

While the explanation was given assuming a case of a contact center where agents are divided into a plurality of line groups, the skill of agents can be correctly computed even in a call center configured otherwise using the technology according to the present invention.

The configuration of the apparatus and program described above is an example. The components can be divided or integrated as needed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable non-transitory recording medium that stores therein a computer program that causes a computer to execute:

classifying response data indicative of response made by an agent to an inquiry from a customer, except for response data including a transfer flag that indicates whether an inquiry was transferred to another agent, into first data corresponding to easy inquiries and second data corresponding to difficult inquiries, the response data with the transfer flag being classified into the second data;

counting number of the easy inquiries and number of the difficult inquiries; and computing a total skill value of the agent based on a first skill value computed from the first data, a second skill value computed from the second data, and a ratio of the number of the easy inquiries to the number of the difficult inquiries, wherein the classifying includes grouping the response data based on similarity of contents of the inquiries, and classifying the response data into the second data when number of other data with older date in the same similarity group is less than a threshold.

2. The computer-readable non-transitory recording medium according to claim 1, wherein the computing includes computing the total skill value of an agent based on an average of the ratio of all the agents.

3. The computer-readable non-transitory recording medium according to claim 2, wherein the computing includes reflecting number of inquiries that an agent transfers to another agent to the average of the ratio as the number of difficult inquiries to compute the total skill value of the agent.

4. The computer-readable non-transitory recording medium according to claim 1, wherein the computing includes computing the total skill value of an agent based on a standard deviation of the ratio of all the agents.

5. The computer-readable non-transitory recording medium according to claim 4, wherein the computing includes reflecting number of inquiries that an agent transfers to another agent to the standard deviation of the ratio as the number of difficult inquiries to compute the total skill value of the agent.

6. The computer-readable non-transitory recording medium according to claim 1, further causing the computer to execute:
classifying the response data into groups based on predetermined rules, wherein
the computing includes computing the skill value of the agent with respect to each of the groups.

7. A skill-value computing apparatus comprising:
a classifying unit that classifies response data indicative of response made by an agent to an enquiry from a customer, except for response data including a transfer flag that indicates whether an inquiry was transferred to another agent, into first data corresponding to easy inquiries and second data corresponding to difficult inquiries, the response data with the transfer flag being classified into the second data;
a counting unit that counts number of the easy inquiries and number of the difficult inquiries; and
a computing unit that computes a total skill value of the agent based on a first skill value computed from the first data, a second skill value computed from the second data, and a ratio of the number of the easy inquiries to the number of the difficult inquiries,
wherein the classifying unit groups the response data based on similarity of contents of the inquiries, and classifies the response data into the second data when total response time of other data with older date in the same similarity group is less than a threshold value.

8. The skill-value computing apparatus according to claim 7, wherein the computing unit computes the total skill value of an agent based on an average of the ratio of all the agents.

9. The skill-value computing apparatus according to claim 7, wherein the computing unit computes the total skill value of an agent based on a standard deviation of the ratio of all the agents.

10. A skill-value computing method comprising:
classifying response data indicative of response made by an agent to an enquiry from a customer, except for response data including a transfer flag that indicates whether an inquiry was transferred to another agent, into first data corresponding to easy inquiries and second data corresponding to difficult inquiries, the response data with the transfer flag being classified into the second data;
counting number of the easy inquiries and number of the difficult inquiries; and
computing a total skill value of the agent based on a first skill value computed from the first data, a second skill value computed from the second data, and a ratio of the number of the easy inquiries to the number of the difficult inquiries,
wherein the classifying includes
grouping the response data based on similarity of contents of the inquiries, and
classifying the response data into the second data when number of other data with older date in the same similarity group is less than a threshold.

11. The skill-value computing method according to claim 10, wherein the computing includes computing the total skill value of an agent based on an average of the ratio of all the agents.

12. The skill-value computing method according to claim 10, wherein the computing includes computing the total skill value of an agent based on a standard deviation of the ratio of all the agents.

13. A skill-value computing apparatus comprising:
a classifying unit that classifies response data indicative of response made by an agent to an enquiry from a customer into first data corresponding to easy inquiries and second data corresponding to difficult inquiries;
a counting unit that counts number of the easy inquiries and number of the difficult inquiries; and
a computing unit that computes a total skill value of the agent based on a first skill value computed from the first data, a second skill value computed from the second data, and a ratio between the number of the easy inquiries and the number of the difficult inquiries, the response data including a transfer flag that indicates whether an incident was transferred to another agent, the computing unit reflecting number of inquiries that an agent transfers to another agent to the ratio as the number of difficult inquiries to compute the total skill value of the agent, wherein the classifying unit groups the response data based on similarity of contents of the inquiries, and classifies the response data into the second data when number of other data with older date in the same similarity group is less than a threshold.

14. A skill-value computing apparatus comprising:
a classifying unit that classifies response data indicative of response made by an agent to an enquiry from a customer into first data corresponding to easy inquiries and second data corresponding to difficult inquiries;
a counting unit that counts number of the easy inquiries and number of the difficult inquiries; and
a computing unit that computes a total skill value of the agent based on a first skill value computed from the first data, a second skill value computed from the second data, and a ratio between the number of the easy inquiries and the number of the difficult inquiries, the response data including a transfer flag that indicates whether an incident was transferred to another agent, the computing unit reflecting number of inquiries that an agent transfers to another agent to the ratio as the number of difficult inquiries to compute the total skill value of the agent, wherein the classifying unit groups the response data based on similarity of contents of the inquiries, and classifies the response data into the second data when total response time of other data with older date in the same similarity group is less than a threshold value.

15. A skill-value computing method comprising:
classifying response data indicative of response made by an agent to an enquiry from a customer into first data corresponding to easy inquiries and second data corresponding to difficult inquiries;
counting number of the easy inquiries and number of the difficult inquiries; and
computing a total skill value of the agent based on a first skill value computed from the first data, a second skill value computed from the second data, and a ratio between the number of the easy inquiries and the number of the difficult inquiries, the response data including a transfer flag that indicates whether an incident was transferred to another agent, the computing including reflecting number of inquiries that an agent transfers to another agent to the ratio as the number of difficult inquiries to compute the total skill value of the agent, wherein the classifying includes
grouping the response data based on similarity of contents of the inquiries, and
classifying the response data into the second data when number of other data with older date in the same similarity group is less than a threshold.

16. A skill-value computing method comprising:
classifying response data indicative of response made by an agent to an enquiry from a customer into first data corresponding to easy inquiries and second data corresponding to difficult inquiries;
counting number of the easy inquiries and number of the difficult inquiries; and
computing a total skill value of the agent based on a first skill value computed from the first data, a second skill value computed from the second data, and a ratio between the number of the easy inquiries and the number of the difficult inquiries, the response data including a transfer flag that indicates whether an incident was transferred to another agent, the computing including reflecting number of inquiries that an agent transfers to another agent to the ratio as the number of difficult inquiries to compute the total skill value of the agent, wherein the classifying includes
grouping the response data based on similarity of contents of the inquiries, and
classifying the response data into the second data when total response time of other data with older date in the same similarity group is less than a threshold value.

* * * * *